(12) United States Patent
Pryor

(10) Patent No.: US 6,666,574 B1
(45) Date of Patent: Dec. 23, 2003

(54) BLENDER BLADE ASSEMBLY

(75) Inventor: Ernest B. Pryor, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 10/350,839

(22) Filed: Jan. 24, 2003

Related U.S. Application Data

(63) Continuation of application No. 10/161,555, filed on Jun. 3, 2002, now abandoned.

(51) Int. Cl.$^7$ .......................... A47J 43/046; B01F 7/00; B01F 7/16; B02C 18/12; B02C 18/20
(52) U.S. Cl. .......................... 366/205; 99/348; 99/510; 241/282.1; 241/282.2; 241/292.1; 366/314
(58) Field of Search .......................... 99/348, 485, 510; 366/205, 206, 96–98, 197–199, 314, 315, 342, 343, 307, 309; 241/282.1, 282.2, 282.5, 292.1, 97, 98, 277, 199.12, 46, 17; 403/300, 206; D7/378

(56) References Cited

U.S. PATENT DOCUMENTS

| | | | |
|---|---|---|---|
| 1,536,203 A | 5/1925 | Frydenlund |
| 2,109,501 A | 3/1938 | Osius |
| 2,223,018 A | 11/1940 | Christensen |
| 2,284,155 A | 5/1942 | Landgraf |
| 2,585,255 A | 2/1952 | Kochner et al. |
| 2,698,164 A | 12/1954 | Lamb |
| 2,702,571 A | 2/1955 | Murray |
| 2,757,909 A | 8/1956 | Wayne |
| 2,758,623 A | 8/1956 | Malz et al. |
| 2,771,111 A | 11/1956 | Seyfried |
| 2,897,862 A | 8/1959 | Malz et al. |
| 2,940,738 A | 6/1960 | Posener et al. |
| 3,036,614 A | 5/1962 | Knapp |
| 3,240,246 A | 3/1966 | Dewenter |
| 3,368,800 A | 2/1968 | Barnard, Jr. |
| 3,537,691 A | 11/1970 | Tsuruta et al. |
| 3,738,583 A | 6/1973 | Berland et al. |
| 4,087,053 A | 5/1978 | Voglesonger |
| 4,200,244 A | 4/1980 | Sontheimer |
| 4,462,694 A | 7/1984 | Ernster et al. |
| 4,887,909 A | 12/1989 | Bennett |
| 5,487,511 A | 1/1996 | Sansone et al. |
| 5,584,577 A | 12/1996 | Thies |

FOREIGN PATENT DOCUMENTS

| | | |
|---|---|---|
| FR | 59404 | 5/1954 |
| GB | 650869 | 3/1951 |

OTHER PUBLICATIONS

Comments and photograph showing blender blade assembly acknowledged to be prior art and comparison with new blender blade assembly; and on sale information, undated.

*Primary Examiner*—Timothy F. Simone
(74) *Attorney, Agent, or Firm*—Roger S. Dybvig

(57) ABSTRACT

A blender blade assembly has a lower blade and an upper blade, each having a planar center section and curved outer blade sections. The blades extend in the same longitudinal direction so that the upper blade sections are above the lower blade sections. The blade sections are so curved that ingredients in the path of rotating blades are funneled between them. Such funneling can create a tendency for the ingredients to form a swirling mass which rotates with the blade assembly and detracts from the efficiency of the blade assembly. Therefore, the curved blade sections of the upper blade extend at an upward angle sufficient to avoid the creation of a swirling mass of ingredients that rotates with the blade assembly.

4 Claims, 1 Drawing Sheet

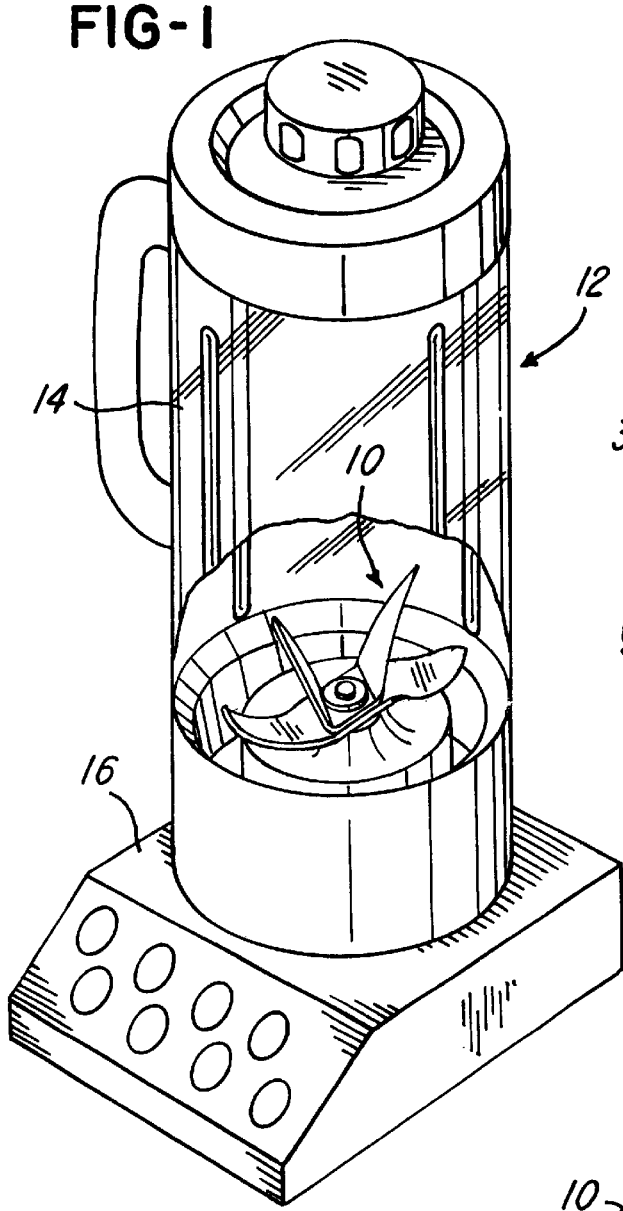
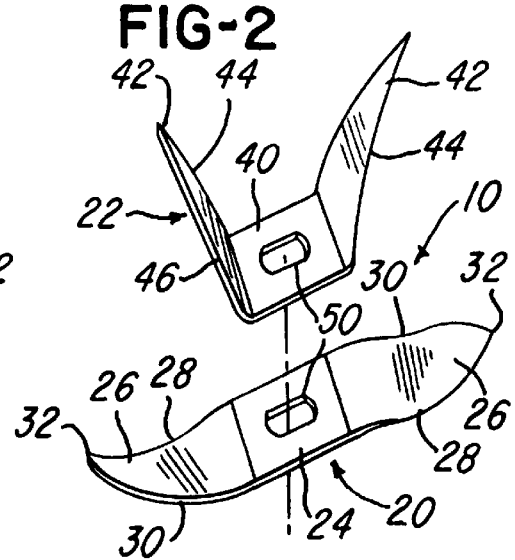
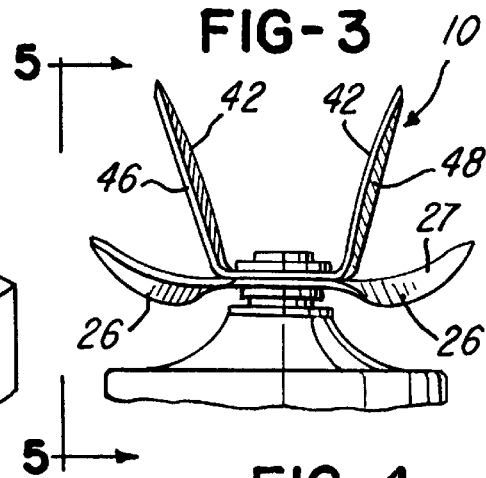
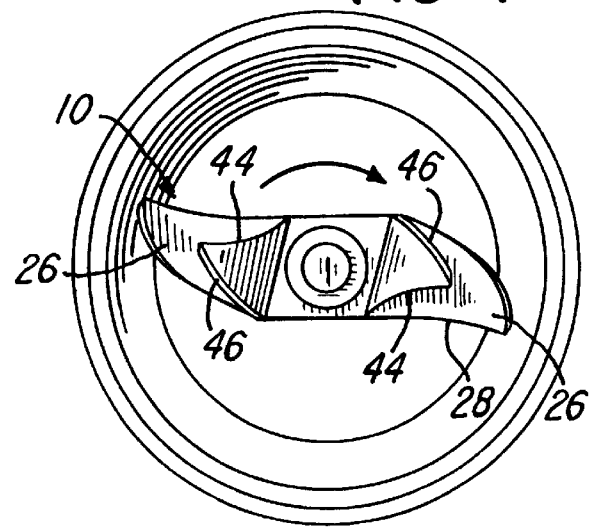
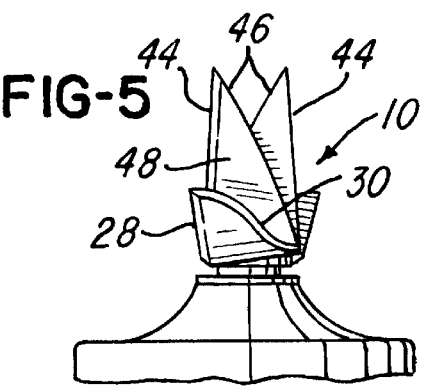

BLENDER BLADE ASSEMBLY

Cross-Reference to Related Application

This application is a continuation of application Ser. No. 10/161,555, filed Jun. 3, 2002, now abandoned.

FIELD OF THE INVENTION

The invention relates to a blade assembly which may be used in a food blender that is capable of pulverizing or crushing ice.

BACKGROUND OF THE INVENTION

A common electrical kitchen appliance is a food blender which reduces the particle size of fresh fruit and vegetables by cutting, blending, chopping, shredding, pulverizing, etc. Most household food blenders also may be used to crush ice in those situations where the presence of large ice particles is not critical. Heavy duty commercial are available for forming small, snow like particles from ice. The snow-like ice particles are commonly used in the preparation of alcoholic cocktails, e.g., "frozen" margarita, "frozen" daiquiri, etc. and non-alcoholic "slushy" fruit drinks.

SUMMARY OF THE INVENTION

An object of this invention is to provide a blender blade assembly useful in food blenders and constructed to be particularly effective for crushing ice in which the crushed ice is in the form of fine snow-like particles free of chips or pieces.

In accordance with the invention, the blade assembly includes two symmetrical blades, namely, a first, lower blade and a second, upper blade. Both blades have a horizontal, flat or planar center section and curved blade sections at each end of the center section. The center sections of the blades are stacked one on top of the other and are essentially coextensive with one another. The blades extend in the same longitudinal direction so that the upper blade sections are above the lower blade sections. The blade sections are curved such that ingredients in the path of the blade assembly as it rotates are forced by the upper blade toward the lower blade and also forced by the lower blade toward the upper blade. This causes a funneling of the ingredients and is believed essential to producing snow-like particles from ice in an efficient manner.

The funneling of the ingredients such as ice can create a tendency for the ingredients to form a swirling mass which rotates with the blade assembly and seriously detracts from the efficiency of the blade assembly. This tendency is overcome in accordance with this invention by forming the blades sections of the upper blade such that they extend at an angle of between about 60° and 80°, and preferably at an angle of about 65° to 75° from horizontal and relative to the lower blade sections. Such construction partly retains the funneling action described above and also avoids the formation of a mass of ingredients that rotate with the blade assembly.

BRIEF DESCRIPTION OF THE DRAWINGS

FIG. 1 is a perspective view of an electric blender provided with the blade assembly of the present invention.

FIG. 2 is an exploded perspective view of the blade assembly of FIG. 1.

FIG. 3 is a front elevational view of the blade assembly shown mounted on a hub.

FIG. 4 is a top plan view of the blade assembly and diagrammatically illustrating its relationship with the blender and the direction of rotation thereof.

FIG. 5 is a side elevational view of the blade assembly as viewed in the direction of the arrows 5—5 of FIG. 3.

DETAILED DESCRIPTION

With reference to FIG. 1, the blade assembly 10 of this invention is shown employed in a blender 12 having a receptacle 14 on top of a blender base 16.

The blade assembly 10 is useful for reducing the particle size of various food substances, and particularly for crushing ice to provide a powdery, snow-like product which has a uniform particle size. The powdery, snow-like form of ice is especially useful in the preparation of frozen drinks.

Referring to FIG. 2, the blade assembly 10 comprises two blades, a lower blade 20 and an upper blade 22, each made from hardened stainless steel, and each extending generally along the same horizontal axis so that the lower surfaces of the upper blade 22 face the upper surfaces of the lower blade 20. The lower blade 20 has a horizontal, flat or planar center section 24 and two curved blade sections 26 at each end of the center section 24. Each curved blade section 26 has an arcuately curved, concave leading knife edge 28 that dips slightly below the plane of the flat center 24 and an arcuately curved, concave trailing edge 30, the concavity of which is shallower than the concavity of the leading edge 24. The leading edges 28 and the trailing edges 30 join to form pointed outer blade tips 32 above the plane of the center section 24 (FIG. 2). Each curved blade section 26 has an upper surface 27 (FIG. 3) that faces partly forwardly relative to the direction of rotation so that, upon rotation of the blender blade assembly 10 in the direction indicated by the arrow in FIG. 4, the ingredients being blended engaged by the curved blade sections are elevated over the curved blade sections 26.

The upper blade 22 comprises a horizontal, planar center section 40 engaged and mounted on top of the planar center section 24 of the lower blade 20 and substantially coextensive therewith. The upper blade 22 further comprises upwardly-extending curved blade sections 42 at each end of the center section 40 thereof. The upwardly-extending blade sections 42 are generally triangular in shape, but have concavely curved leading knife edges 44 and convexly curved trailing edges 46. The lower surfaces 48 of the upwardly-extending blade sections 42 face partly forwardly so that, upon rotation of the blender blade assembly 10, the ingredients being blended and engaged by the upwardly-extending blade sections 42 are directed downwardly over the lower surfaces 48 thereof toward the lower blade 20.

The center sections 24 and 40 are provided with double D slots 50 for receiving a double D shaft of a blender motor (not shown) in the blender base 14.

Because the upwardly-extending blade sections 42 of the upper blade overly the blade sections 26 of the lower blade 20, ingredients in the paths of the blades 20 and 22 will be slightly funneled between the upper and lower blades 20 and 22. To avoid a condition in which the ingredients are pushed out ahead of the blades, which causes the creation of a mass of ingredients that rotates with the blades, the angle of inclination of the upwardly-extending blade sections 42 is determined by trial and error to be sufficiently remote from horizontal that ingredients being blended will not be caused to rotate with the blade assembly 10. In practice, as mentioned earlier, the upwardly-extending blade sections 42 should be between about 60° and 80°, and preferably at an angle of about 65° to 75°, from horizontal and relative to the lower blade sections 26.

While it is believed that the total configuration wherein each specific shape and arrangement of the blade assembly is important in producing the uniform, snow-like ice particles, it is apparent that a major contribution to producing the desired effect is in the angle of the two upper blades with respect to the horizontal plane of the upper pair of blades.

Although the presently preferred embodiments of this invention have been described, it will be understood that within the purview of the invention various changes may be made within the scope of the following claims.

I claim:

1. A blender blade assembly comprising:

a first, lower blade having a horizontal, flat center section and curved blade sections at each end of said center section, each said curved blade section having an arcuately curved, concave leading edge that dips below the plane of said flat center section and an arcuately curved, concave trailing edge, the concavity of which is shallower than the concavity of said leading edge, said leading and trailing edges joining to form pointed blade tips above the plane of the center section and terminating in an pointed outer tip, each said curved blade section having an upper surface that faces forwardly so that, upon rotation of said blender blade assembly, the ingredients being blended engaged by the curved blade sections are elevated over the curved blade sections; and a second, upper blade having a horizontal, planar center section mounted on top of the planar center section of said first lower blade and substantially coextensive therewith and upwardly extending curved blade sections at each of said center sections thereof, said upwardly-extending blade sections being generally triangular in shape, but having concavely curved leading edges and convexly curved trailing edges, said upwardly extending blade sections having lower surfaces that face partly forward so that, upon rotation of said blender blade assembly, the ingredients being blended engaged by the curved blade sections are directed downwardly over the lower surfaces thereof toward said lower blade, said upwardly-extending blade sections of said upper blade overlaying said blade sections so that, as said blades rotate, ingredients in the paths of the blades, the angle of inclination of said upwardly-extending blade sections being sufficiently for from horizontal that ingredients being blended will not be caused to rotate with the blade assembly.

2. The blender blade assembly of claim 1 wherein said upwardly-extending blade sections extend upwardly from horizontal at an angle between approximately 60° and 80° degrees.

3. The blender blade assembly of claim 1 wherein said blades tips of said first, lower blade are above the horizontal plane of said center section thereof.

4. The blender blade assembly of claim 3 wherein said upwardly-extending blade sections extend upwardly from said center section of said upper blade at an angle between approximately 60° and 80°.

* * * * *